United States Patent [19]

Yamaoka et al.

[11] Patent Number: 4,886,142
[45] Date of Patent: Dec. 12, 1989

[54] HYDRAULIC FOUR-WHEEL DRIVE SYSTEM

[75] Inventors: Kojiro Yamaoka, Nishinomiya; Toshiro Azuma, Minoo; Kazuhiko Yano, Toyonaka; Ryota Ohashi, Kobe, all of Japan

[73] Assignee: Kanzaki Kokyukoki Mfg. Co. Ltd., Japan

[21] Appl. No.: 211,912

[22] Filed: Jun. 27, 1988

[30] Foreign Application Priority Data

Jun. 26, 1987 [JP] Japan .................. 62-160648
Jun. 26, 1987 [JP] Japan .................. 62-160649
Jun. 26, 1987 [JP] Japan .................. 62-160650
Jun. 26, 1987 [JP] Japan .................. 62-160651
Jun. 27, 1987 [JP] Japan .................. 62-160687

[51] Int. Cl.$^4$ ........................... B60K 17/356
[52] U.S. Cl. ........................ 180/242; 180/307; 60/484
[58] Field of Search ............. 180/233, 252, 242, 243, 180/333, 305, 307, 6.24; 60/420, 455, 483, 484

[56] References Cited

U.S. PATENT DOCUMENTS 4,140,196 2/1979 Brewer .................. 180/44 F
4,241,577 12/1980 Baldauf .................. 180/242

FOREIGN PATENT DOCUMENTS 51-87213 7/1976 Japan .
53-119531 10/1978 Japan .
57-15020 1/1982 Japan .
57-201724 12/1986 Japan .

Primary Examiner—Charles A. Marmor
Assistant Examiner—Richard Camby
Attorney, Agent, or Firm—Saidman, Sterne, Kessler & Goldstein

[57] ABSTRACT

A hydraulic four-wheel drive apparatus for driving by a hydraulic motor four wheels: steering wheels and driving wheels, in which the steering wheels are driven by a variable capacity motor for the steering wheels and a front differential gear unit, and the driving wheels are driven by a fixed capacity motor for the driving wheels, so that, when a vehicle turns, a swash plate of the variable capacity motor associates with operation of a steering handle, thereby accelerating the speeds of steering wheels.

6 Claims, 8 Drawing Sheets

HYDRAULIC FOUR-WHEEL DRIVE SYSTEM

FIELD OF THE INVENTION

The present invention relates to a hydraulic four-wheel drive system and more particularly to technique for increasing the speed of steering wheels at a four-wheel drive system running vehicle driven by a HST (hydrostatic transmission) when the vehicle turns, so that a speed difference is prevented from creating between the steering wheels used also for driving and the driving wheels only for driving.

DESCRIPTION OF THE PRIOR ART

The prior art disclosed in the U.S. Pat. No. 4140196 interposes a fixed capacity motor at the driving wheel side so that an output from the fixed capacity motor is input to a differential gear so as to drive the driving wheels, which is the same as the present invention.

The fixed capacity motors are laterally provided at the steering wheel side and an amount of pressure oil fed to the fixed capacity motors is adjusted by an electromagnetic throttle valve, thereby adjusting the speeds of the left and right wheels to turn the vehicle.

The four-wheel drive vehicle is so designed that the rotation speed of the steering wheel coincides with that of the driving wheel when running straightforward, but the vehicle turns around the driving wheel side, whereby a turning radius of each steering wheel and the rotation speed of the steering wheel is slower than the actual running speed, thereby creating inconvenience such that the wheel chips out the ground or the vehicle cannot make a sharp turn.

The conventional technique to eliminate the above inconvenience has been disclosed in the Japanese Patent Laid-Open No. Sho 51-87213, Patent Laid-Open No. Sho 53-119531, Patent Laid-Open No. Sho 57-15020, and Patent Laid-Open No. Sho 57-201724, which all provide the variable capacity pumps for both the steering and driving wheels and the capacity of the variable capacity pump for the steering wheels is changed, thereby increasing the rotation speeds of the steering wheels more than that of the driving wheels.

However, when the vehicle moves straightforward, both the variable capacity pumps must be synchronized with accuracy, and the steering-driving wheels must increase the number of rotations more than the driving wheels only when the vehicle turns. Hence, both variable capacity pumps and steering unit must be connected by use of a complicated linkage mechanism and an electric circuit so as to be controlled with accuracy.

SUMMARY OF THE INVENTION

A first object of the invention is to provide a four-wheel drive system which interposes a differential gear unit between the steering wheels to apply differential rotation thereto so that the vehicle can be driven by one variable capacity motor, and when running straightforward an amount of pressure oil discharged from the variable capacity pump allows the fixed capacity motor for the driving wheels to synchronize with the variable capacity motor for the steering-driving wheels, and when turning, variation in capacity of the variable capacity motor for the steering wheels can increase the rotation speed more than the driving wheels.

A second object of the invention is to provide a four-wheel drive system which can drive also the variable capacity motor for the steering wheels and one variable capacity motor is used to thereby devise simplification of the circuit.

A third object of the invention is to provide a four-wheel drive system which, when a transmission is interposed between the driving wheels in order to raise transmission efficiency of the fixed capacity motor and the transmission is operated to change the speed toward the top stage, makes the variable capacity motor for the steering wheels freely rotatable and preferably changes a rotation angle of a swash plate at the variable capacity motor with respect to a turning angle by a steering unit, thereby enabling an increase in the synchronized speed.

These and other objects of the invention will become more apparent in the detailed description and examples which follow.

DESCRIPTION OF THE PREFERRED EMBODIMENT

Figure 1:
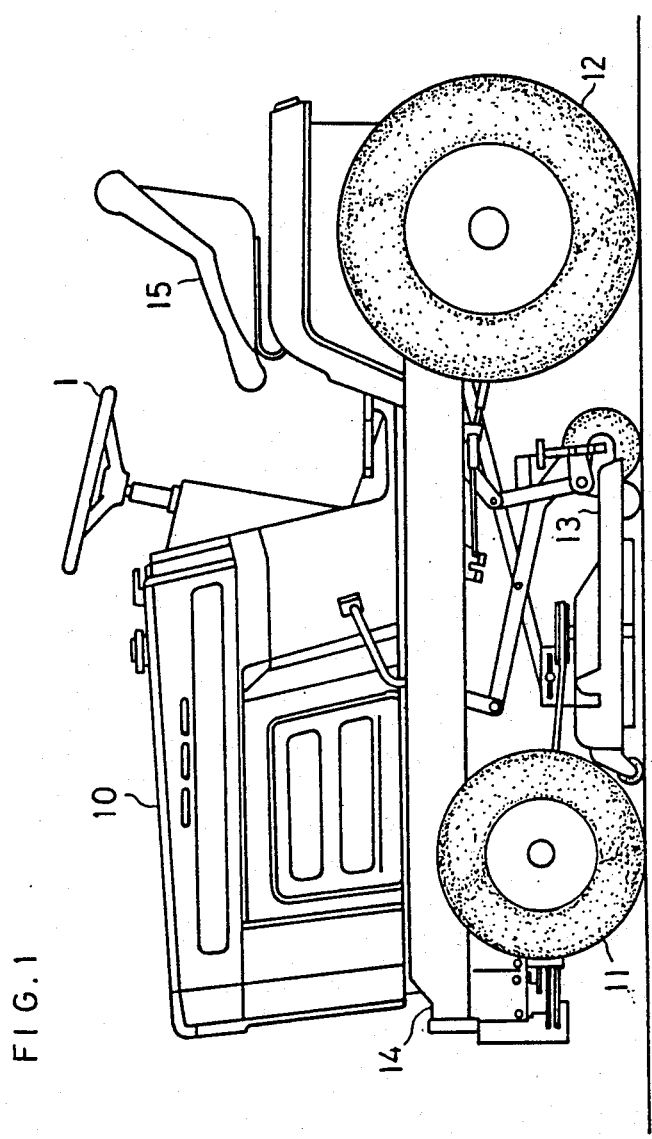
FIG. 1 is a general side view of a tractor loading a hydraulic four-wheel drive system of the invention.

Referring to FIG. 1, explanation will be given on general construction of a tractor equipped with a mower 13.

An engine E (not shown) is loaded on the front of a vehicle body 14 and a bonnet 10 covers the engine E.

A variable capacity pump PF for steering wheels and a variable capacity pump PR for driving wheels, or one variable capacity pump P, are attached to the engine E in the bonnet 10, the pumps feed pressure oil for rotating a variable capacity motor MF for steering wheels and a fixed capacity motor MR for driving wheels.

Steering wheels 11L and 11R are supported under the front of the body 14, driving wheels 12L and 12R being supported under the rear thereof.

The steering wheels 11 are driven by the variable capacity pump PF for driving the steering wheels, which is called the steering wheels because of serving mainly to steer the vehicle.

The vehicle is driven not only by the driving wheels 12 but also by the steering wheels 11, but the former is called the driving wheel because of mainly applying a driving force thereby.

Also, a mower 13 is suspended at an intermediate portion between the steering wheels and the driving wheels 12.

The mower 13 is housed for enabling the vehicles running on the road, or vertically adjustable to adjust mowing height.

Conventionally, a power transmission shaft for driving the steering wheels 11 is disposed in a space between the rear wheels and the front wheels and higher than a transmission case for driving the driving wheels 12, whereby the mower cannot be largely raised.

In the present invention, pressure oil is fed from the variable capacity pump provided at the engine E to the variable capacity motor MF for steering wheels through a feed pipe to thereby transmit the motive power, whereby there is no need of disposing the power transmission shaft above the mower, thereby enabling the mower to be largely raised.

A steering handle 1 is disposed at the rear end of the bonnet 10 and an operator sitting on a shaft 15 operates a steering handle 1 when the vehicle is turned.

In association with the rotation of steering handle 1, a swash plate 2 of a variable unit for the variable capacity motor MF for steering wheels is rotated.

Figure 8:
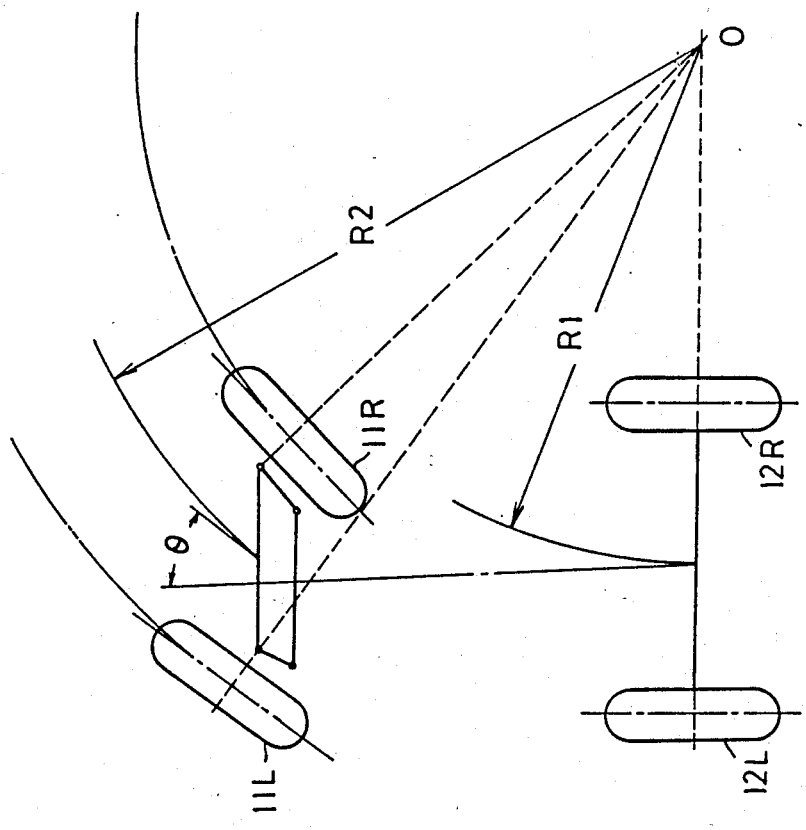
FIG. 8 shows a steering-turning state of the vehicle.

As shown in FIG. 8, when the four-wheel drive vehicle moves straightforward, the steering wheels 11 and driving wheels 12 rotate at equal speed, but once the steering handle is operated to start turning, in order to carry out smooth turn, the steering wheels 11 turn depicting a circular arc of radius R2 and the driving wheels turn depicting the same of R1 around the turning center O of one point on the extension of the common axis of driving wheels 12.

Therefore, when running straightforward, the steering wheels 11 and driving wheels 12 advance at substantially equal speed, but, when turning, the steering wheels 11 pass on a circular arc of a larger turning radius and the driving wheels 11 on the same of a smaller turning radius, whereby the steering wheels 11L and 11R are different from each other in the running speed and rotation speed.

In a case where the steering wheels 11 and driving wheels 12 are constituted to be substantially equal in the speed, the vehicle turns mainly by the speed of the driving wheels 12 of a larger ground contact area, so that the steering wheels rotate slower than actual running speed and are dragged to pull turf or scrape out soil.

In addition, a speed difference between the actual running speed and the rotation speed varies corresponding to variation in a turning angle $\theta$.

In the present invention, the rotation speeds of steering wheels 11L and 11R increase in association with the operation of steering handle 1.

Next, explanation will be given on the principal portion of the invention with reference to FIG. 2.

The variable capacity pump PF for steering wheels and the variable capacity pump PR for driving wheels are attached to the engine E and a charge pump 4 is attached to both the variable capacity pumps.

Pressure oil discharged from the charge pump 4 is supplied as operating oil to an extent of leaked oil into a closed circuit of the variable capacity pump PF for steering wheels and variable volume motor MF for steering wheels and that of the variable capacity pump PR for driving wheels and variable capacity motor MR for driving wheels through check valves 25 and 26, or 25' and 26'. In addition, reference numeral 17 designates a relief valve for the charge pump 4.

An overload relief valve 18 is provided in order to discharge the pressure oil to a drain circuit through check valves 27 and 28 when the driving wheels are subjected to an overload so as not to rotate the fixed capacity motor MR for driving wheels.

Also, an overload relief valve 16 for discharging the pressure oil to the drain circuit through check valves 29 and 30 when subjected to an overload is disposed also in the circuit of the variable capacity pump PF for steering wheels and variable capacity motor MF for steering wheels.

A swash plate 3 is disposed as a variable unit at the variable capacity pump PR for driving wheels, a swash plate 9 also being provided as the variable unit at the variable capacity pump PF for steering wheels.

Both the swash plates 3 and 9 are connected to a speed change lever T, whereby the steering wheels 11 and rear wheels 12 are speed-changed at the synchronized speed by operating the speed change lever.

Also, the swash plates 3 and 9 rotate to carry out stepless speed-change of forward, neutral and rearward.

Next, explanation will be given on the steering wheels 11.

The pressure oil is transported from the variable capacity pump PF for steering wheels to the variable capacity motor MF for steering wheels through the closed circuit.

The variable capacity motor MF makes variable the rotation of motor shaft 7 by rotation of a swash plate 2 as the variable unit, thereby further changing the speed-change rotation by the swash plate 9 at the variable capacity pump PF for steering wheels.

The swash plate 2 associates with a member corresponding to the turning angle $\theta$ by operating the steering handle 1 and simultaneously rotates.

A pinion 7a is provided at a motor shaft 7 of the variable capacity motor MF for steering wheels, and drives a front differential 19. Front axles laterally projecting therefrom drive the steering wheels 11L and 11R.

Next, explanation will be given on the driving wheels 12.

The pressure oil discharged from the variable capacity pump PR is fed to the fixed capacity motor MR for driving wheels through the closed circuit and the operating oil after driving the motor MR is returned to the variable capacity pump PR for driving wheels.

The fixed capacity motor MR for driving wheels is of constant volume system and provided with no rotary swash plate, so that the direction and amount of oil fed from the variable capacity pump perform stepless speed change of forward, neutral and rearward only, so that the speed change at the portion of fixed capacity motor MR for driving wheels is impossible.

A pinion 8a is attached to a motor shaft 8 at the fixed capacity motor MR for driving wheels, which drives a rear differential gear 20 and the driving wheels 12L and 12R are driven by rear axles laterally projecting from the rear differential gear 20.

Next, explanation will be given on an embodiment of the invention.

Figure 3:
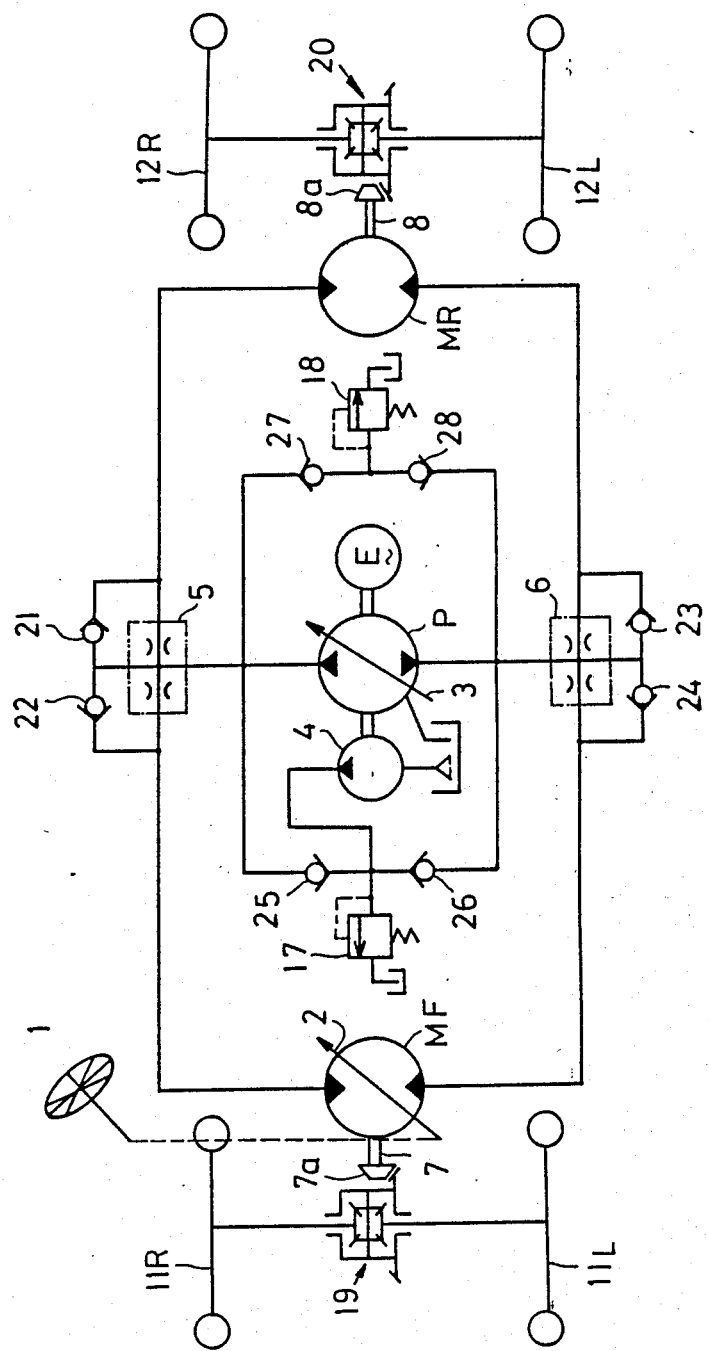
FIG. 3 is a hydraulic circuit diagram of a hydraulic stepless transmission which uses one variable capacity pump to separate oil flow into the driving wheels and steering wheels by use of a constant ratio flow dividing valve.

In FIG. 3, the variable capacity pump PF for steering wheels and variable capacity pump PR are collected into one as a variable volume pump P.

The variable capacity pump P is attached to the engine E and a change pump 4 is attached to the pump P.

A constant ratio flow dividing valve 5 is interposed in a branch circuit at which an oil passage forward from the variable capacity pump P is divided toward the variable capacity motor MF for steering wheels and fixed capacity motor MR for driving wheels and check valves 22 and 21 for passing the return oil from the variable capacity motor MF for steering wheels and fixed capacity motor MR for driving wheels are interposed in parallel to the constant ratio flow dividing valve 5.

A constant ratio flow dividing valve 6 is disposed at a branch circuit at which an oil passage rearward of the variable capacity pump P is divided toward the variable capacity motor MF for steering wheels and fixed capacity motor MR for driving wheels and return check valves 24 and 23 are disposed in parallel to a throttle at the constant ratio flow dividing valve 6.

The pressure oil is fed from the branch circuits from the constant ratio flow dividing valves 5 and 6 and through feed pipes to the variable capacity motor MF for steering wheels and fixed capacity motor MR for driving wheels and then circulates in the closed circuit to return to the variable capacity pump P.

Next, explanation will be given on modified embodiments in FIGS. 4 and 5.

Figure 4:
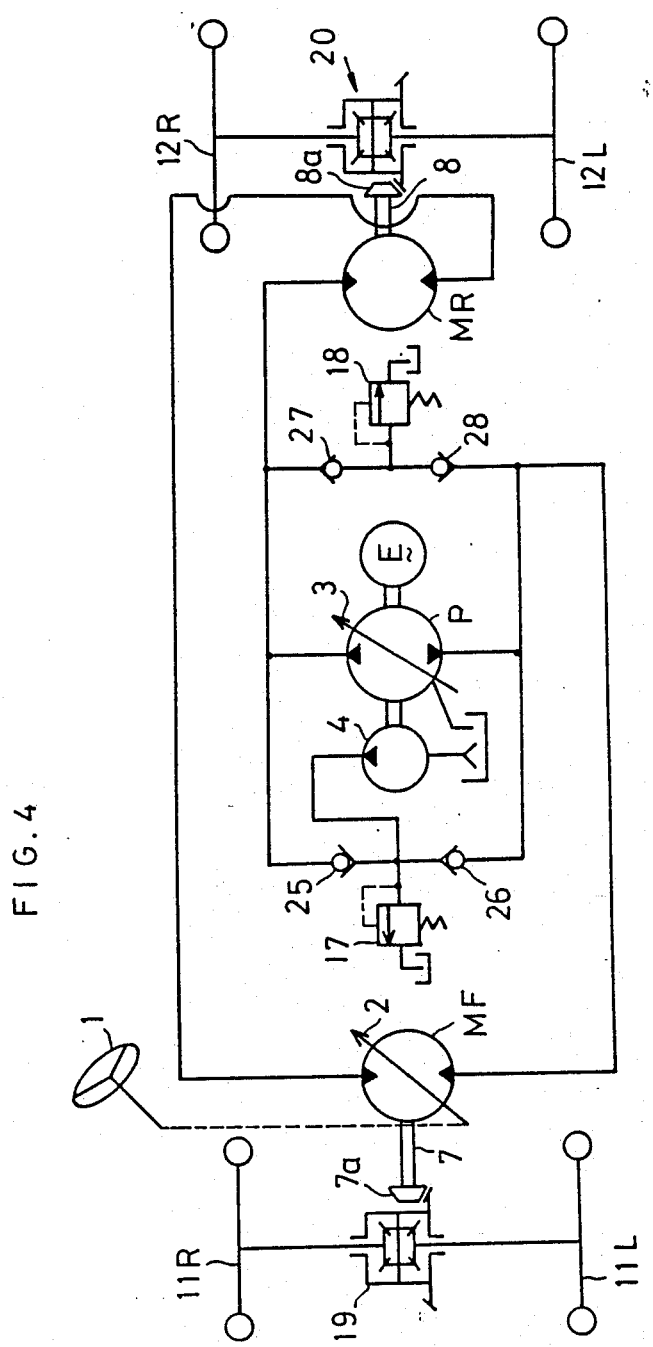
FIGS. 4 and 5 are hydraulic circuit diagrams of a hydraulic stepless transmission which drives the steering wheels by return oil after driving the driving wheels.
Figure 5:
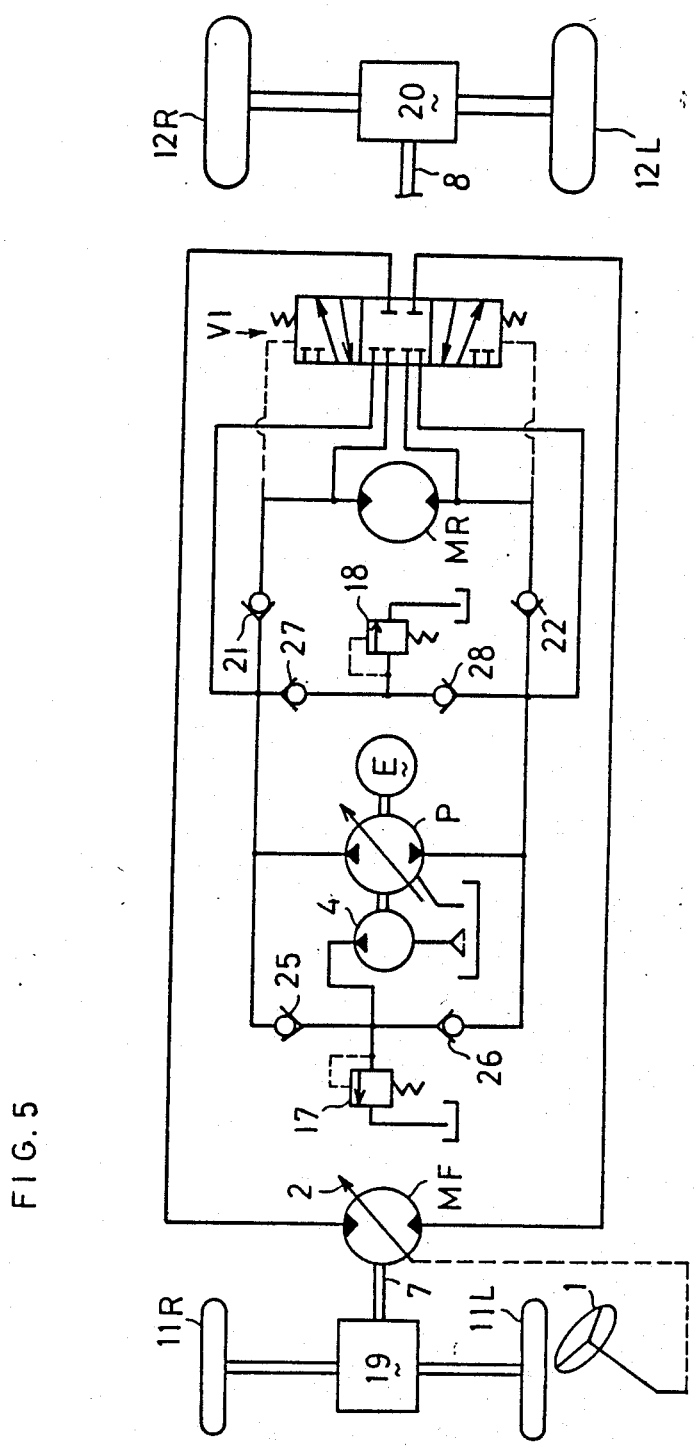

In FIGS. 4 and 5, only one variable capacity pump P is provided and oil discharged therefrom is fed into a closed circuit wherein a variable capacity motor MF for steering wheels and a fixed capacity motor MR for driving wheels are connected in series with each other. Both the motors MF and MR utilize the return oil from the other so as to rotate.

In the embodiment in FIG. 4, when the vehicle runs straightforward, the discharged oil in advance is fed to the fixed capacity motor MR for driving wheels to drive the motor MR and thereafter the return oil drives the variable capacity motor MF for steering wheels.

Conversely, when running rearward, the variable capacity motor MF for steering wheels is driven in advance and thereafter the fixed capacity motor MR for driving wheels is driven.

Thus, in the modified embodiment in FIG. 4, the fixed capacity motor MR is driven in advance, or the variable capacity motor MF is driven in advance, so that it is impossible to always mainly drive the fixed capacity motor MR and subsequently drive the variable capacity motor MF.

On the contrary, in another modified embodiment in FIG. 5, an automatic directional control valve V1 is provided so that the valve V1 is switched for straightforward and rearward travelling, whereby it is possible that the fixed capacity motor MR is always driven in advance and the variable capacity motor MF is driven later.

In other words, the automatic directional control valve V1 is interposed, whereby the discharge oil from the variable capacity pump P passes through the fixed capacity motor MR for driving wheels and drives it and then the return oil therefrom is guided to the variable capacity motor MF for steering wheels through the automatic directional control valve V1.

Next, explanation will be given on a further modified embodiment of the invention shown in FIG. 6.

Figure 6:
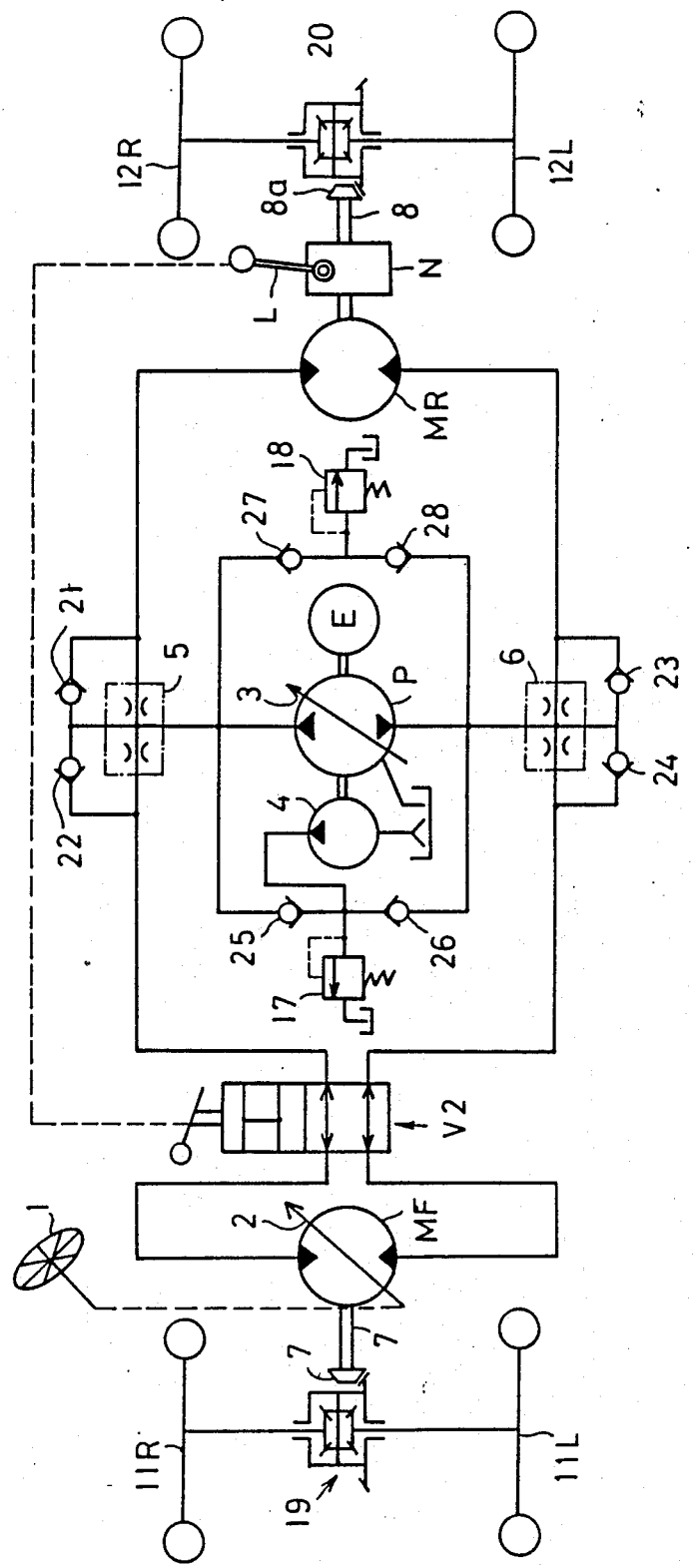
FIG. 6 is a hydraulic circuit diagram of a hydraulic stepless transmission which interposes transmission gears between the fixed capacity motor and the differential gear unit at the driving wheel side.

In FIG. 6, a sub-transmission N is interposed between the fixed capacity motor MR for driving wheels and a rear differential 20 so as to improve transmission efficiency of the motor MR.

In the present embodiment, an open center positioning directional control valve V2 is interposed between the variable capacity pump P and the variable capacity motor MF for steering wheels.

The open center positioning directional control valve V2 associates with a sub-speed-change lever L at the sub-transmission N. In a case where the sub-speed-change lever L is operated to the high speed stage and the vehicle runs at high speed on the road, the open center positioning directional control valve V2 is positioned at the open center so that the pressure oil does not rotate the motor but circulates in the return circuit to the pump, thereby putting the steering wheels 11L and 11R in an idling state.

Figure 2:
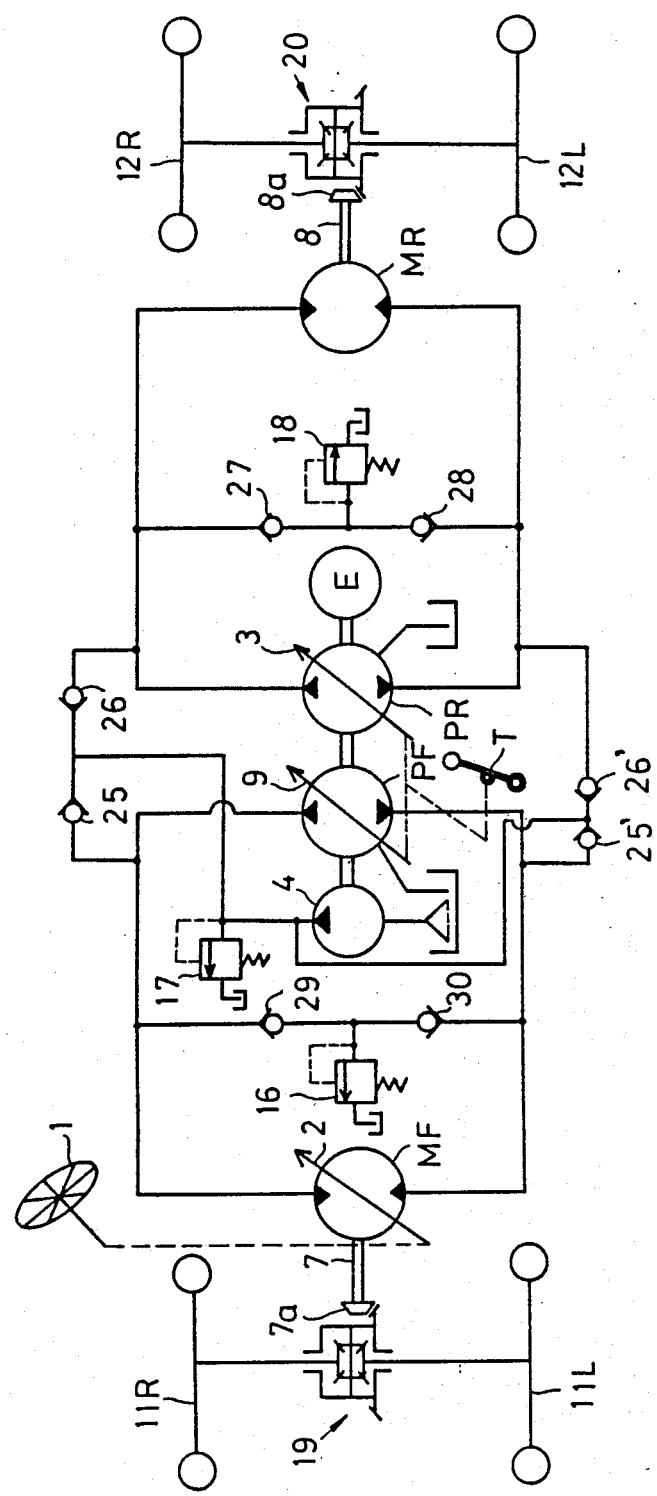
FIG. 2 is a hydraulic circuit diagram of a hydraulic stepless transmission which operates two variable capacity pumps by a single speed change lever.

Also, the open center positioning directional control valve V2 may of course be applicable to the hydraulic circuit diagrams in FIGS. 2, 4 and 5, in which the sub-transmission is provided.

Figure 7:
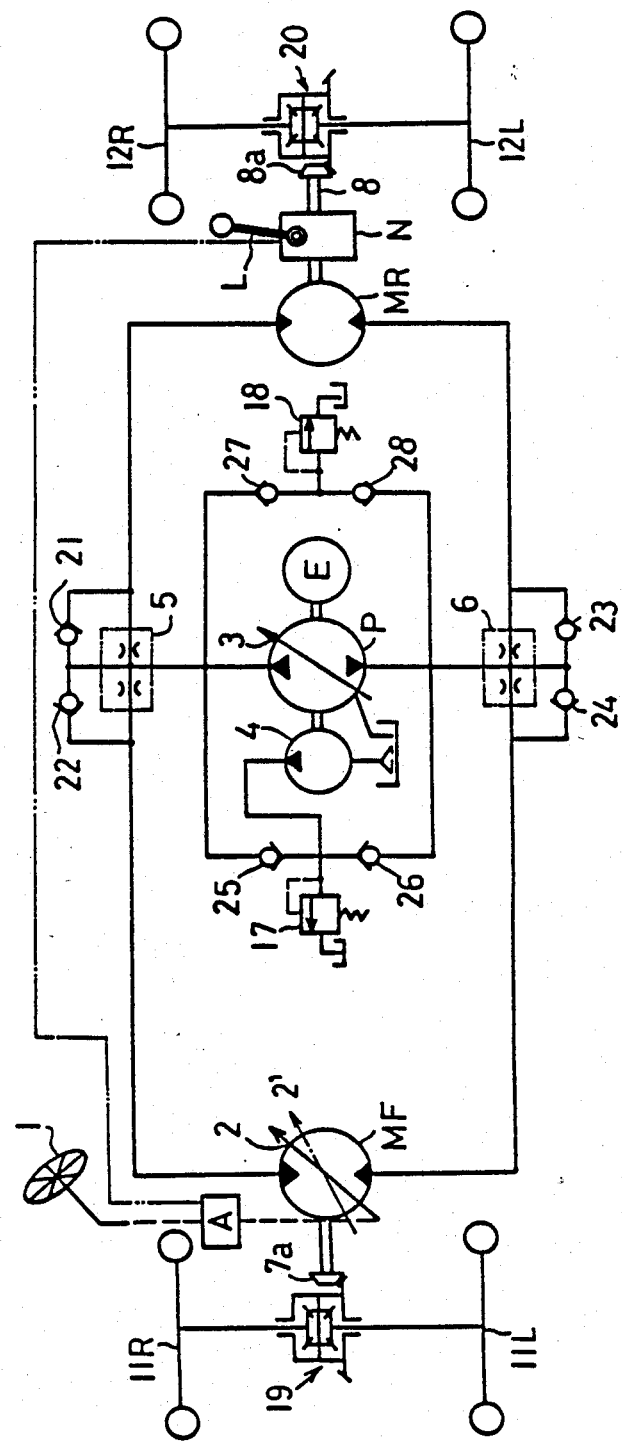
FIG. 7 is a hydraulic circuit diagram of a hydraulic stepless transmission which interposes a transmission gear between the fixed capacity motor and the differential gear unit at the driving wheel side and also changes a rotation angle of a swash plate corresponding to a turning angle of a steering unit when changing the speed.

Next, explanation will be given on a still further modified embodiment in FIG. 7.

In the present embodiment, a sub-transmission N is provided between the fixed capacity motor MR for driving wheels and the rear differential gear 20 to thereby change the speed by a sub-speed-change lever L, which is the same as the FIG. 6 embodiment. In this case, the steering wheels 11L and 11R also change the speed in association with operation of the sub-speed-change lever L.

In order to increase the speed of steering wheels 11L and 11R, a device the same as the sub-transmission N need only be interposed between the variable capacity motor MF for steering wheels and the front differential 19, which is impossible because of a high manufacturing cost.

Instead of the above, utilizing a rotation angle and a wide operating area of the swash plate 2 at the variable capacitor motor for steering wheels, a high-and-low switching device A for changing a length of a link or an arm so as to change an operating angle of the swash plate is provided between the steering handle 1 and the swash plate 2, thereby associating with the sub-speed-change lever L.

Hence, when the sub-speed-change lever L operates the sub-transmission N, the link and the arm at the high-and-low switching device A is switched in length in association with the operation of lever L, so that the steering wheels 11L and 11R can change the speed and synchronize with each other corresponding to the speed changes of driving wheels 12L and 12R.

In this state, when the vehicle is turned, the rotation angle of swash plate 2 with respect to the turning angle θ of steering handle 1 changes to further increase the speed of variable capacity motor MF for steering wheels.

Now, in the present invention, the first invention and the second invention of the concrete example thereof can eliminate a speed difference, which is generated between the actual rotational speed and the running speed of steering wheels 11L and 11R at the four-wheel drive vehicle, by increasing the rotation of the variable capacity motor MF for steering wheels corresponding to the turning radius thereof.

Therefore, the inconvenience such that the steering wheels 11 have hitherto scraped out soft ground or scratched a grassland or turf can be eliminated.

Furthermore, when the vehicle runs straightforward, the variable capacity motor returns to normal rotation and an amount of oil in the variable capacity pump changes, so that the variable capacity motor can change the vehicle speed while rotating accurately in synchronism with the fixed capacity motor.

Also, since a driving force of the engine E is changed to oil pressure by the variable capacity pump P so as to drive by the fixed capacity motor MR the steering wheels 11 and driving wheels 12, a power transmission shaft for driving the front wheels as conventional does not pass under the frame at the vehicle body, whereby when a working machine, such as the mower 13, is mounted on, for example, the vehicle's venter, the mower can be housed in a high position.

Next, in the third invention, since the pressure oil is flow-divided by the constant ratio flow dividing valves 5 and 6 into the variable capacity motor MF for steering wheels and fixed capacity motor MR for driving wheels, only one expensive variable capacity pump need only be used. Also, the pressure oil is given from the motors MF and MR to the differentials 19 and 20, whereby two hydraulic motors need only be used and one variable capacity pump P and two variable and fixed capacity motors can constitute the four-wheel drive apparatus.

In the fourth invention, the discharge oil of one variable capacity pump P is used to drive both the variable capacity pump motor MF and fixed capacity motor MR, whereby there is no need of providing the variable capacity pump P at each motor and also the constant ratio flow dividing valve is eliminated, thereby reducing the number of parts to constitute the four-wheel drive vehicle at a low manufacturing cost and by a simple circuit.

In the fifth invention, the transmission is interposed between the fixed capacity motor MR and the rear differential 20, so that when the speed of driving wheels is changed, it is ideal that the steering wheels subsequently change the speed, but it is expensive to provide a transmission also at the steering wheel side.

However, when the vehicle runs at high speed on the road, the steering wheels do not require a particular tractive force, so that the open center positioning directional control valve to change the rotation of motor MF from the driving rotation to the driven rotation is interposed between the variable capacity pump and the variable capacity motor, thereby circulating the operating oil therein when running at high speed so as to freely rotate the steering wheels to change the vehicle from the four-wheel drive vehicle to two-wheel drive without being subjected to damage, such as seizure.

Furthermore in the sixth invention, even when the speed of driving wheels is changed, the steering wheels subsequently change the speed to always perform four-wheel drive. Hence, any particular device is not provided and a wide operating area of the variable capacity motor MF is utilized to enable variation in rotation angles of the steering handle 1 and swash plate 2.

In other words, the rotation angle of swash plate is changed in association with speed change operation of the transmission N so as to change capacity of the variable capacity motor so that the speed of steering wheels when running straightforward follows that of driving wheels, and when turning, the speed can increase corresponding to the amount of operation of steering handle 1.

Although several embodiments have been described, they are merely exemplary of the invention and not to be constructed as limiting, the invention being defined solely by the appended claims.

What is claimed is:

1. A hydraulic drive system for a vehicle having at least one driving wheel and at least one steering wheel, comprising:
    a variable capacity motor including a swash plate and a motor shaft;
    a steering handle connected to said swash plate;
    a steering wheel differential gear driven by said motor shaft for driving the steering wheel of said vehicle;
    a fixed capacity motor;
    a driving wheel differential connected to said fixed capacity motor for driving the driving wheel of said vehicle;
    a hydraulic supply means, said hydraulic supply means comprising a variable capacity pump connected to an engine, wherein said hydraulic supply means connects said variable capacity motor with said fixed capacity motor;
    said swash plate, in association with said steering handle, varies the rotation of said motor shaft, when said steering handle is turned, said steering wheel changes speed corresponding to a turning radius of said steering handle.

2. A hydraulic drive system for a vehicle having at least one driving wheel and at least one steering wheel, comprising:
    a variable capacity motor including a swash plate and a motor shaft;
    a steering handle connected to said swash plate;
    a steering wheel differential gear driven by said motor shaft for driving the steering wheel of said vehicle;
    a fixed capacity motor;
    a driving wheel differential connected to said fixed capacity motor for driving the driving wheel of said vehicle;
    a hydraulic supply means, said hydraulic supply means comprising a variable capacity pump connected to an engine, wherein said hydraulic supply means connects said variable capacity motor and said fixed capacity motor;
    said swash plate, in association with said steering handle, varies the rotation of said motor shaft, steering when said steering handle is turned, said steering wheel changes speed corresponding to a turning radius of said steering handle; and
    whereby return oil, after driving said fixed capacity motor, is adapted to drive said variable capacity motor.

3. A hydraulic four-wheel drive system according to claim 1, characterized in that said hydraulic supply means comprises two variable capacity pumps which separately drive said variable capacity motor and fixed capacity motor, a swash plate of each of said variable capacity pumps associates with each other through one speed change lever.

4. A hydraulic four-wheel drive system according to claim 1, characterized in that said hydraulic supply means comprises one variable capacity pump so that pressure oil to be fed to said variable capacity motor and fixed capacity motor is flow-divided by a constant ratio flow dividing valve in the directions toward said motors respectively.

5. A hydraulic four-wheel drive system according to claim 1, characterized in that a transmission mechanism is interposed between said differential gear for said driving wheels and said fixed capacity motor and a directional control valve which, when said transmission mechanism is operated to be speed-changed to the high speed stage, is switched to an open center position where said variable capacity motor is freely rotatable.

6. A hydraulic four-wheel drive system according to claim 1, characterized in that a transmission mechanism is interposed between said differential gear unit and said fixed capacity motor for said driving wheels so that a rotation angle of said swash plate corresponding to said turning angle of said steering unit is changed corresponding to a speed change operation unit at said transmission mechanism.

* * * * *